US012764058B2

(12) United States Patent
Parthasarathy et al.

(10) Patent No.: US 12,764,058 B2
(45) Date of Patent: Oct. 13, 2026

(54) GENERATIVE ARTIFICIAL INTELLIGENCE (AI) INTEGRATION TOOL

(71) Applicant: Freshworks Inc., San Mateo, CA (US)

(72) Inventors: Ramesh Parthasarathy, Chennai (IN); Bruno Da Silva Bozza, Kirkland, WA (US); Vijay Raajaa, Bengaluru (IN)

(73) Assignee: Freshworks Inc., San Mateo, CA (US)

( * ) Notice: Subject to any disclaimer, the term of this patent is extended or adjusted under 35 U.S.C. 154(b) by 267 days.

(21) Appl. No.: 18/790,763

(22) Filed: Jul. 31, 2024

(65) Prior Publication Data

US 2026/0039584 A1 Feb. 5, 2026

(51) Int. Cl.
*H04L 45/00* (2022.01)

(52) U.S. Cl.
CPC .................................... *H04L 45/22* (2013.01)

(58) Field of Classification Search
CPC ........................................................ H04L 45/22
See application file for complete search history.

(56) References Cited

U.S. PATENT DOCUMENTS

2018/0324105 A1* 11/2018 Gillon ................. H04L 12/2801
2024/0419950 A1* 12/2024 Tong .................... G06N 3/0475

* cited by examiner

*Primary Examiner* — Mohammad S Anwar
(74) *Attorney, Agent, or Firm* — LeonardPatel PC; Sheetal S. Patel; Michael A. Leonard, II

(57) ABSTRACT

A system architecture configured to integrate with a plurality of generative artificial intelligence (AI) implementations across public and private cloud-based platforms. More specifically, the system provides a multitenant, cloud-based platform for building machine learning (ML) endpoints using low level generative AI models.

17 Claims, 4 Drawing Sheets

400

200

300

GENERATIVE ARTIFICIAL INTELLIGENCE (AI) INTEGRATION TOOL

FIELD

The present invention relates to an artificial intelligence (AI) integration tool, and more particularly, to integrating an AI integration platform across multiple customer relationship management (CRM) applications.

BACKGROUND

Accessing Large Language Models (LLMs) across multiple cloud providers to build enterprise-grade Generative (GEN) AI applications presents significant challenges and is susceptible to performance degradation. For example, risk of leaking sensitive data, navigating integration complexities, ensuring consistent performance and availability despite infrastructure variations, dealing with cloud providers' availability guarantees, and tackling auto-scaling challenges. Additionally, securely storing security keys across multiple users, and defining Role-Based Access Control (RBAC) are challenges that one would face.

Some embodiments resolve this issue by introducing a gateway (or platform) configured to permit access to multi-cloud LLM models through a standardized interface, ensuring governance, security, reliability, and scalability. This facilitates the seamless development of enterprise-grade applications.

Furthermore, a centralized enterprise setup is established and configured to intelligently adjust prompts, thereby enhancing the accuracy of LLM responses by considering the context of the query. In another embodiment, intelligent routing of calls is performed across a blend of LLMs provided by hybrid cloud environments, optimizing for cost, accuracy, and latency.

This result is relieving platform users of concerns regarding LLM prompts and model selection or cloud platform choice, as the platform user can now trust that the prompts provided accurately execute the given instruction across cloud platform providers.

Thus, an interpolation framework must be implemented to address this bias in the model. Accordingly, an improved label biasing technique may be beneficial.

SUMMARY

Certain embodiments of the present invention may provide solutions to the problems and needs in the art that have not yet been fully identified, appreciated, or solved by current integration applications. For example, some embodiments of the present invention pertain to a multitenant, cloud-based platform configured to machine learning (ML) endpoints using low level generative AI models.

In an embodiment, a system configured to integrate an AI platform across a plurality of CRM applications includes at least one processor and memory comprising a set of instructions. The set of instructions is configured to cause at least one processor to execute dynamically routing user instructions comprising a prompt across a set of LLMs hosted by one or more cloud-based providers. The dynamically switching from one of the one or more cloud-based providers to another one of the one or more cloud-based providers when the one of the one or more cloud-based providers encounters an error.

In another embodiment, a computer-implemented method integrating an AI platform across a plurality of CRM applications includes dynamically routing user instructions comprising a prompt across a set of LLMs hosted by one or more cloud-based providers. The computer-implemented method further includes dynamically switching from one of the one or more cloud-based providers to another one of the one or more cloud-based providers when the one of the one or more cloud-based providers encounters an error.

In yet another embodiment, a non-transitory computer-readable medium is configured to integrate an AI platform across a plurality of CRM. The non-transitory computer-readable medium includes a computer program that is configured to cause at least one processor to execute dynamically routing user instructions comprising a prompt across a set of LLMs hosted by one or more cloud-based providers. The computer program is further configured to cause at least one processor to dynamically switch from one of the one or more cloud-based providers to another one of the one or more cloud-based providers when the one of the one or more cloud-based providers encounters an error.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not, therefore, to be considered to be limiting in its scope, the invention will be described and explained with additional specificity and detail through the use of the accompanying drawings, in which.

DETAILED DESCRIPTION OF THE EMBODIMENTS

Figure 1:
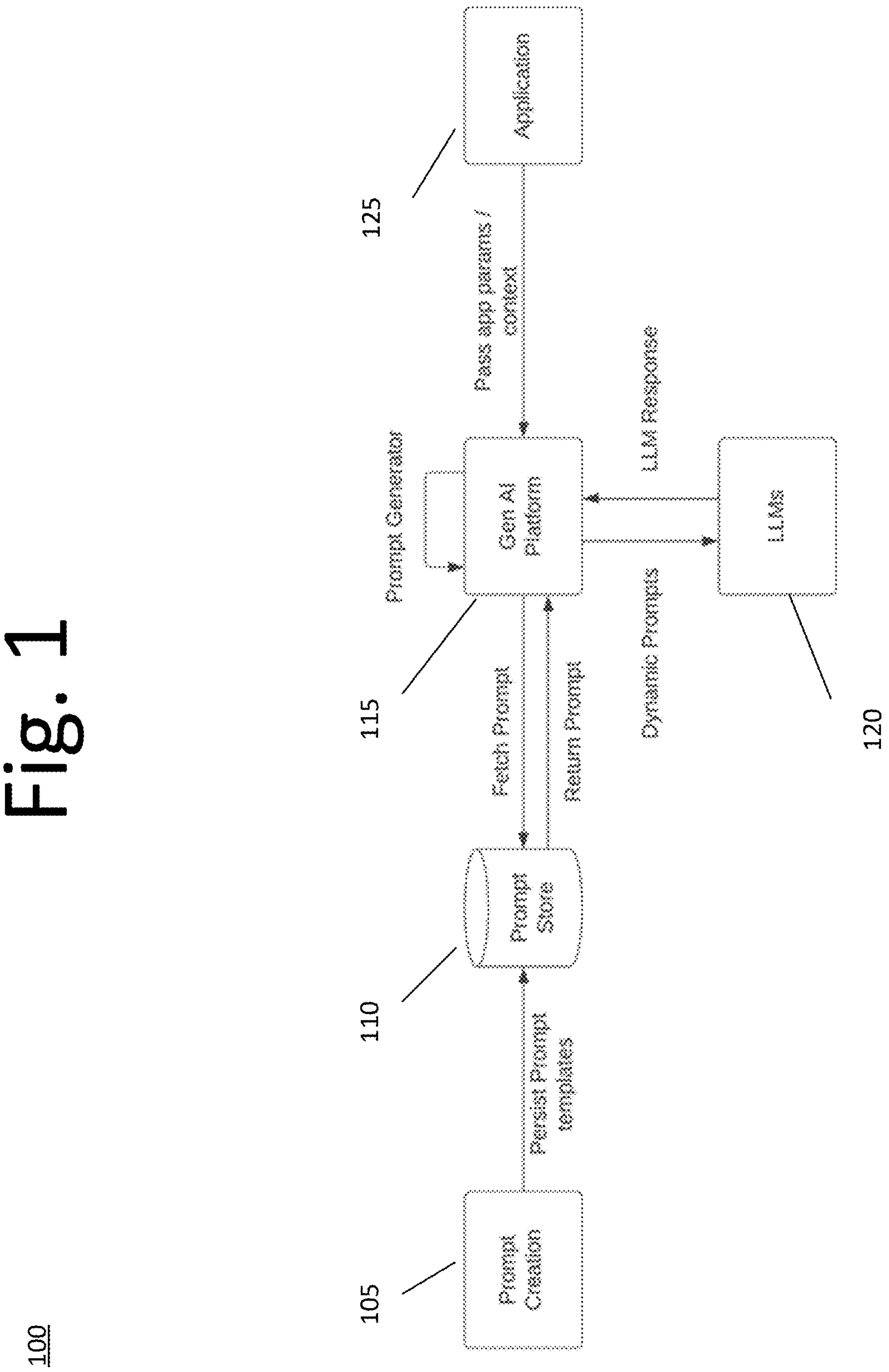
FIG. 1 is a diagram illustrating a system configured to integrate the Gen AI platform across CRM applications, according to an embodiment of the present invention.

Some embodiments generally pertain to a system architecture (the "system") configured to integrate with a plurality of generative AI implementations across public and private cloud-based platforms. More specifically, the system is configured to provide a multitenant, cloud-based platform for building machine learning (ML) endpoints using low level generative AI models.

The system may provide interoperability across any cloud platform, enabling users to build ML applications easily through a unified interface. The platform offers a cohesive abstraction layer for hybrid cloud LLM models, effectively shielding end users from the intricacies of managing cloud integrations, authentication, authorization, and other technicalities via API interfaces. This abstraction enables users to switch between LLM models across different clouds and seamlessly establish machine learning services across diverse cloud environments.

Additionally, the system offers robust data governance and security features, ensuring the confidentiality and integrity of the data. This is primarily important when it comes to enterprise governance and security of the platform. The platform extends its support to enterprise governance and security measures, incorporating features such as PII masking, secure storage of LLM multi-tenant keys, rate limiting to counteract potential attacks, and robust authentication and authorization protocols. Furthermore, the platform ensures secure invocation of LLM models across multiple clouds, safeguarding sensitive data and operations within a comprehensive security framework.

The system may allow users to link an ML service built into the platform with the supported ML applications through the configurable pipeline. The platform presents a layered abstraction, i.e., an initial layer may configure the model and prompt, a service layer may set up the configuration, and a third layer may expose the Application Programming Interface (API) endpoint with the configured parameters.

The system provides exceptional performance, with a latency of less than 20 ms, making it ideal for applications that meet enterprise SLAs/SLOs. The platform achieves Service Level Agreement (SLA) adherence through a comprehensive set of strategies. Resource allocation is optimized to match varying service demands, ensuring efficient use of computational resources. Scalability is built into the platform, enabling it to dynamically adjust to changing workloads without compromising performance. Continuous monitoring and automated alerting systems promptly notify administrators of potential issues, facilitating timely intervention to maintain SLA compliance. Fault tolerance mechanisms ensure high availability by incorporating redundancy and resilience against failures. Performance optimization efforts focus on refining algorithms, data pipelines, and infrastructure components to sustain high performance levels. Additionally, SLA management tools empower administrators and users to define, monitor, and enforce SLAs effectively. By combining these strategies, the platform delivers a reliable and responsive experience while meeting or exceeding SLA commitments, thereby ensuring the satisfaction of its users.

Furthermore, the system exposes both public and private LLM, enabling the user to leverage the system's full capabilities. The platform allows for multi-tenant users to access both external cloud based LLM models and privately hosted LLM models in a seamless manner. Users can interact with these models efficiently, leveraging their capabilities for diverse machine learning tasks. Whether accessing models hosted on external cloud platforms or within private infrastructure, the platform's architecture ensures smooth interaction without compromising performance or accessibility.

The system ensures reliability and uptime to easily manage production workloads, ensuring the user's applications are always available.

The system provides traceability and observability across all levels, enabling users to monitor and troubleshoot any issues. The platform offers extensive distributed tracing capabilities, recognizing their critical role in maintaining system integrity within a distributed environment. This functionality allows end-to-end tracing of calls made to the platform, providing users with a comprehensive view of the entire process. By breaking down latency at each layer, users gain valuable insights into performance bottlenecks and system behavior, empowering them to optimize and streamline operations effectively.

In short, some embodiments provide an innovative system that includes a comprehensive solution for integrating with a plurality of gen AI implementations, making the system an ideal platform for building enterprise-grade ML applications across any field.

In some embodiments, the system dynamically modifies the prompt for more accurate responses. In an embodiment, sophisticated algorithms are developed to dynamically adapt real-time prompts for specific customers. These dynamic adaptations optimize the user experience by tailoring the language model's responses to the individual customer's needs and objectives. The platform considers (or takes into account) various contextual factors, including but not limited to, the user's preferred language, location, and the context of the instruction, to dynamically change the instruction of the prompt before hitting the LLM model. For instance, if the prompts are about summarizing a conversation or ticket thread, the platform considers the size of the messages, language preference, and context across threads and dynamically manages prompt chains effectively to ensure the accuracy of the service.

In cases where the language model's classification has low confidence during prediction, the algorithm may invoke a chain of thought to provide more contextually relevant responses. This comprehensive approach ensures that interactions are highly personalized and contextually appropriate, improving accuracy and user satisfaction. Dynamic prompt updates can be based on:

1. Channel-based: Ticket or Chat—the context of the ticket or chat is tapped and a few short examples are added in the prompt dynamically prior to firing the same to LLM; and/or
2. Multiple templates are supported and selected based on the app context such as language-specific prompt instruction and prompt based on app context.

FIG. 1 is a diagram illustrating a system 100 configured to integrate Gen AI platform 115 across CRM applications, according to an embodiment of the present invention. In some embodiments, system 100 includes a prompt creation module 105, a prompt store 110, a GEN AI platform 115, one or more LLMs 120, and an application 125.

In some embodiments, prompt creation module 105 pertains to prompt creation for an ML service that involves crafting concise, clear instructions or queries all of which effectively guide the model towards generating desired outputs or performing specific tasks, ensuring optimal utilization and accurate results. The prompt store 110 module may archive a diverse range of prompts. This way, accessibility and organization are ensured to build a ML service, while also prioritizing data privacy and compliance. The Gen AI platform 115, for example, may serve as a multi-tenant API gateway, which facilitates secure access to LLM endpoints across hybrid clouds, while prioritizing governance, monitoring, and scalability features to promote ML services seamlessly across data centers and domains, including analytics and rate limiting. Application module 125 is an internal product that integrates with Gen AI Platform 115 to build an enterprise grade Gen AI application. The one or more LLMs 120 may include different classes of LLMs that are accessible across cloud providers.

In certain embodiments, system 100 may also provide an Intelligent Language Model Selection and Routing Across Cloud Providers. Platform 115 may extend beyond intelligent model selection by dynamically routing user instructions across a set of LLM models 120 hosted by various cloud providers. This dynamic routing considers many constraints, including accuracy, latency, cost, and rate limits, to ensure optimal performance and resource utilization. When the selected LLM model from one cloud provider encounters issues, such as a 429 TOO MANY REQUESTS error, platform 100 seamlessly, and in near real-time, switches to another provider that satisfies the user's requirements while abiding by the defined constraints. This ensures uninterrupted service and minimizes disruptions due to service limitations or outages.

Furthermore, platform 100 empowers users to control cost versus accuracy trade-offs. Users can make informed decisions based on their specific needs by offering different LLM options, each with varying cost structures and performance profiles. This feature allows users to strike the right balance between cost-effectiveness and the quality of responses, providing a flexible and cost-efficient solution. The idea is to build and train a linear model based on the cost, accuracy and latency. So given the new prompt instruction, the linear model detects which cloud/model combination is well suited. The preference on the above factors will be taken as the input as well−w1*cost (M)+w2*accuracy (M)−W3*latency (M).

In short, the modules shown in FIG. 1 are as follows.

- Prompt Creation 105: a professional creates the prompt templates to be given to any model.
- Prompt Store 110: a database that stores prompt templates as text.
- Gen AI Platform 115: retrieves prompt templates from Prompt Store 110, and can use the same template once placeholders are filled with a multitude of models.
- LLMs 120: a collection of AI services capable of responding to prompts in an intelligent manner.
- Application 125: a system that sends a prompt template identifier and placeholder fillers to the Gen AI Platform and obtains results from one of the available LLMs.

In some embodiments, a prompt template identifier is used to identify a prompt template that is stored in prompt store 110, and placeholder fillers are used for prompts from LLMs 120 to be filled with.

Figure 2:
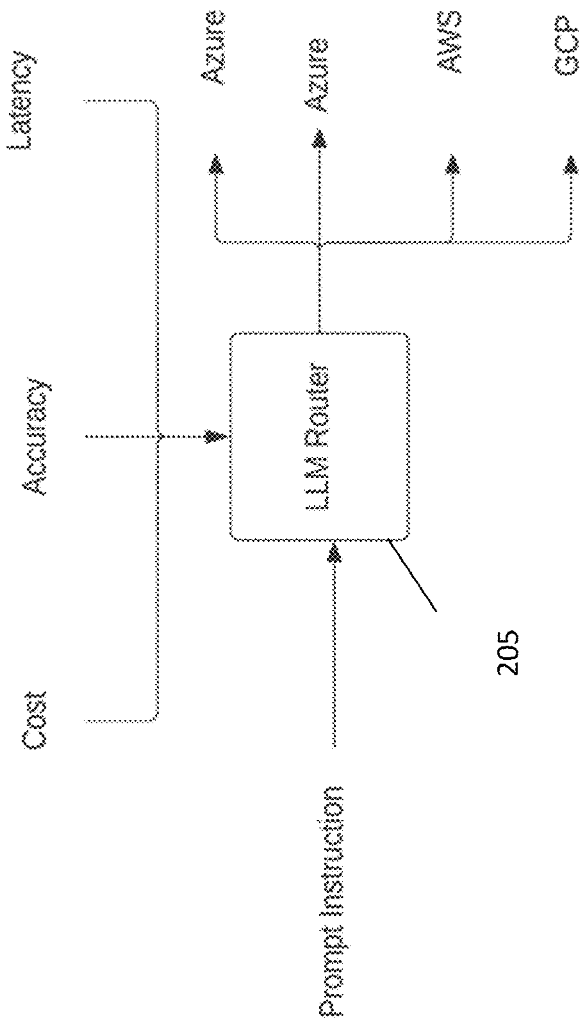
FIG. 2 is a diagram illustrating a flow chart using a LLM router configured to decide which LLM to select for a given prompt instructions, according to an embodiment of the present invention.

FIG. 2 is a diagram illustrating a flow chart 200 using a LLM router 205 configured to decide which LLM to select for a given prompt instructions, according to an embodiment of the present invention. In some embodiments, "Cost", "Accuracy", and "Latency" are user-provided functions whose values are computed for any model and prompt instruction. LLM router 205 is configured to receive a prompt instruction and one or more of the user-provided functions (or weights). Internally, LLM router 205 uses computed values in conjunction with the user-provided weights to determine the most appropriate model among several, as depicted by the multiple output arrows in FIG. 2.

It should be appreciated that the claim is using a linear model to specify the relative importance of cost, accuracy and latency when selecting an LLM. A linear model is important in these embodiments because the linear model's weights are interpreted as importances, and LLM router 205 knows that accuracy is a positive factor but cost and latency are negative factors.

In some embodiments, LLM router 205 represents a machine learning (ML) powered service configured to select optimal LLM models based on user-defined preferences such as cost, accuracy, and latency. Each of the user-defined preferences are assigned a weight, in conjunction with provided prompt instructions (prompt instructions). Through a computational process, LLM router 205 determines a classification outcome to select an LLM model from the available cloud platform options accessible to the user. Internally, the ML model undergoes training using varied prompts, LLM model utilization costs, outcome accuracies, and latencies, to generate a regression score. The highest scoring model is then recommended to route the user request to the corresponding LLM model (e.g., Azure LLM model, AWS LLM model, Google LLM model, Open AI LLM model, and so forth), facilitating efficient model selection.

Figure 3:
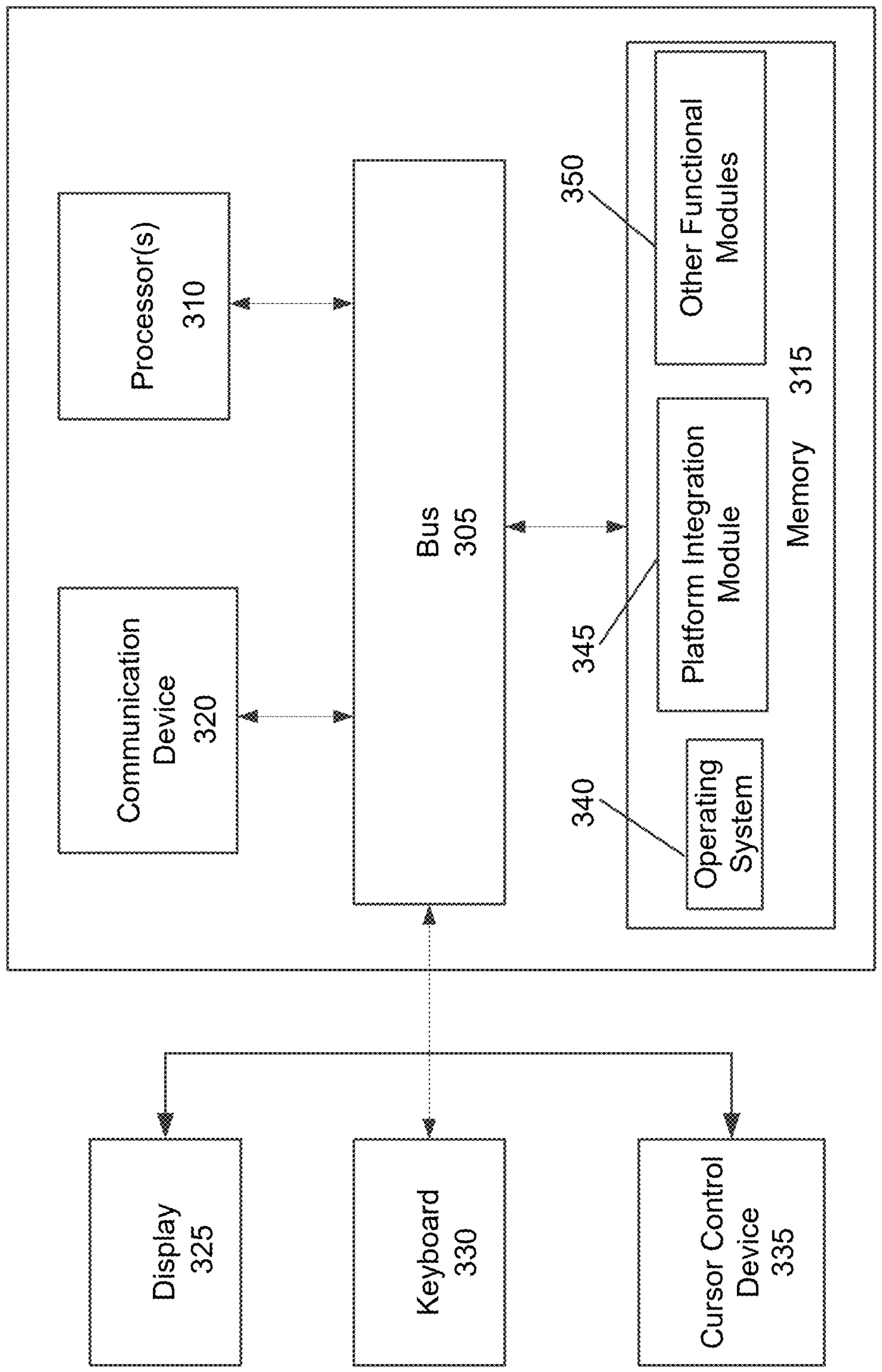
FIG. 3 is an architectural diagram illustrating a computing system configured to perform label biasing of data associated with closed deals using interpolation, according to an embodiment of the present invention.

FIG. 3 is an architectural diagram illustrating a computing system 300 configured to perform label biasing of data associated with closed deals using interpolation, according to an embodiment of the present invention. In some embodiments, computing system 300 may be one or more of the computing systems depicted and/or described herein. Computing system 300 includes a bus 305 or other communication mechanism for communicating information, and processor(s) 310 coupled to bus 305 for processing information. Processor(s) 310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 310 may also have multiple processing cores, and at least some of the cores may be configured to perform specific functions. Multi-parallel processing may be used in some embodiments. In certain embodiments, at least one of processor(s) 310 may be a neuromorphic circuit that includes processing elements that mimic biological neurons. In some embodiments, neuromorphic circuits may not require the typical components of a Von Neumann computing architecture.

Computing system 300 further includes a memory 315 for storing information and instructions to be executed by processor(s) 310. Memory 315 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 310 and may include volatile media, non-volatile media, or both. The media may also be removable, non-removable, or both.

Additionally, computing system 300 includes a communication device 320, such as a transceiver, to provide access to a communications network via a wireless and/or wired connection. In some embodiments, communication device 320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 310 are further coupled via bus 305 to a display 325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 325 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 330 and a cursor control device 335, such as a computer mouse, a touchpad, etc., are further coupled to bus 305 to enable a user to interface with a computing system. However, in certain embodiments, a physical keyboard and mouse may not be present, and the user may interact with the device solely through display 325 and/or a touchpad (not shown). Any type and combination of input devices may be used as a matter of design choice. In certain embodiments, no physical input device and/or display is present. For instance, the user may interact with computing system 300 remotely via another computing system in communication therewith, or computing system 400 may operate autonomously.

Memory 315 stores software modules that provide functionality when executed by processor(s) 310. The modules include an operating system 340 for computing system 300. The modules further include a platform integration module 345 that is configured to perform all, or part of the processes described herein or derivatives thereof. Computing system 300 may include one or more additional functional modules 350 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

Figure 4:
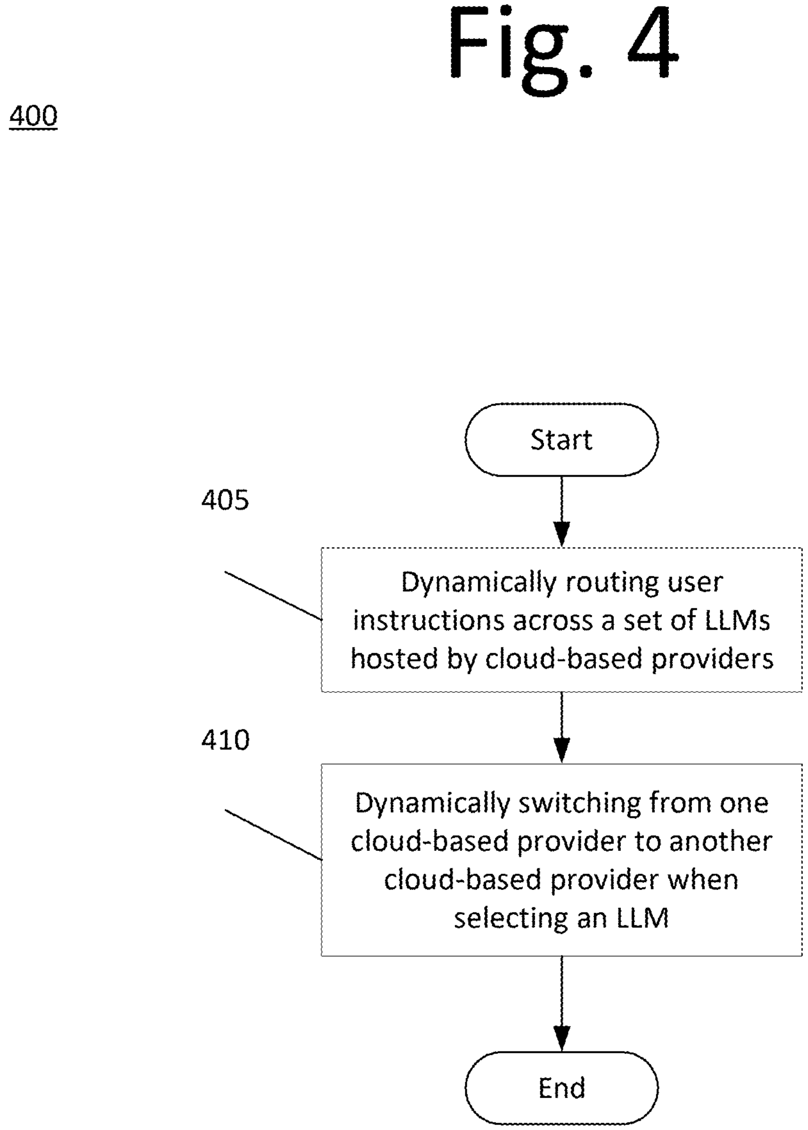
FIG. 4 is a flow diagram illustrating a method 400 for integrating a platform across a plurality of applications (including software as a service (SAAS)), according to an embodiment of the present invention.

FIG. 4 is a flow diagram illustrating a method 400 for integrating a platform across a plurality of applications (including software as a service (SAAS)), according to an embodiment of the present invention. In some embodiments, method 400 may begin at 405 with a computing system dynamically routing user instructions across a set of LLMs hosted by cloud-based providers. At 410, the computing system dynamically switches from one cloud-based provider to another cloud-based provider when selecting an LLM based on availability of the cloud-based provider, the requirements for selecting the one or more LLM, the prompt template, and/or prompt parameters.

The process steps performed in FIG. 4 may be performed by a computer program, encoding instructions for the processor(s) to perform at least part of the process(es) described in FIG. 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 310 of computing system 300 of FIG. 3) to implement all or part of the process steps described in FIG. 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system configured to integrate an artificial intelligence (AI) platform across a plurality of customer relationship management (CRM) applications, comprising:
at least one processor; and
memory comprising a set of instructions, wherein
the set of instructions are configured to cause at least one processor to execute
receive a prompt and a plurality of user-provided functions, wherein the plurality of user-provided functions include values computed for a model from a set of large language models (LLMs) and the received prompt; and
dynamically routing user instructions comprising the prompt across the set of LLMs hosted by one or more cloud-based providers, wherein
the dynamically routing of the user instructions comprises
dynamically switching from one of the one or more cloud-based providers to another one of the one or more cloud-based providers when the one of the one or more cloud-based providers encounters an error.

2. The system of claim 1, wherein the set of instructions are further configured to cause at least one processor to execute
receives a prompt template identifier and a plurality of placeholder fillers from one of the plurality of CRM applications;
generating a result from one of the set of LLMs; and
sending the generated result to the one of the plurality of CRM applications.

3. The system of claim 2, wherein the set of instructions are further configured to cause at least one processor to execute
fetching, from a prompt store, a prompt template using the prompt template identifier; and
filling the plurality of placeholder fillers using a selected one of the set of LLMs.

4. The system of claim 1, wherein the set of instructions are further configured to cause at least one processor to execute
determining or selecting the model from the set of LLMs by using the computed values and user-provided weights.

5. The system of claim 4, wherein the set of instructions are further configured to cause at least one processor to execute
selecting the model from the set of LLMs having the highest score among all models from the set of models.

6. The system of claim 5, wherein the set of instructions are further configured to cause at least one processor to execute
determining the model from the set of LLMs using a plurality of varied prompts, LLM model utilization costs, outcome accuracies, and latencies, to generate a regression score.

7. A computer-implemented method integrating an artificial intelligence (AI) platform across a plurality of customer relationship management (CRM) applications, comprising:
receiving a prompt and a plurality of user-provided functions, wherein the plurality of user-provided functions include values computed for a model from a set of large language models (LLMs) and the received prompt; and
dynamically routing user instructions comprising the prompt across the set of LLMs hosted by one or more cloud-based providers, wherein
the dynamically routing of the user instructions comprises
dynamically switching from one of the one or more cloud-based providers to another one of the one or more cloud-based providers when the one of the one or more cloud-based providers encounters an error.

8. The computer-implemented method of claim 7, further comprising:
receives a prompt template identifier and a plurality of placeholder fillers from one of the plurality of CRM applications;
generating a result from one of the set of LLMs; and
sending the generated result to the one of the plurality of CRM applications.

9. The computer-implemented method of claim 8, wherein the set of instructions are further configured to cause at least one processor to execute fetching, from a prompt store, a prompt template using the prompt template identifier; and filling the plurality of placeholder fillers using a selected one of the set of LLMs.

10. The computer-implemented method of claim 7, further comprising:

determining or selecting the model from the set of LLMs by using the computed values and user-provided weights.

11. The computer-implemented method of claim 10, further comprising:

selecting the model from the set of LLMs having the highest score among all models from the set of models.

12. The computer-implemented method of 11, further comprising:

determining the model from the set of LLMs using a plurality of varied prompts, LLM model utilization costs, outcome accuracies, and latencies, to generate a regression score.

13. A non-transitory computer-readable medium configured to integrate an artificial intelligence (AI) platform across a plurality of customer relationship management (CRM), wherein the non-transitory computer-readable medium comprising a computer program, the computer program is configured to cause at least one processor to execute:

receiving a prompt and a plurality of user-provided functions, wherein the plurality of user-provided functions include values computed for a model from a set of large language models (LLMs) and the received prompt; and dynamically routing user instructions comprising the prompt across the set of LLMs hosted by one or more cloud-based providers, wherein the dynamically routing of the user instructions comprises dynamically switching from one of the one or more cloud-based providers to another one of the one or more cloud-based providers when the one of the one or more cloud-based providers encounters an error.

14. The non-transitory computer-readable medium of claim 13, wherein the computer program is configured to cause at least one processor to execute receives a prompt template identifier and a plurality of placeholder fillers from one of the plurality of CRM applications;

generating a result from one of the set of LLMs; and sending the generated result to the one of the plurality of CRM applications.

15. The non-transitory computer-readable medium of claim 14, wherein the computer program is configured to cause at least one processor to execute fetching, from a prompt store, a prompt template using the prompt template identifier; and filling the plurality of placeholder fillers using a selected one of the set of LLMs.

16. The non-transitory computer-readable medium of claim 13, wherein the computer program is configured to cause at least one processor to execute determining or selecting the model from the set of LLMs by using the computed values and user-provided weights.

17. The non-transitory computer-readable medium of claim 16, wherein the computer program is configured to cause at least one processor to execute selecting the model from the set of LLMs having the highest score among all models from the set of models; and determining the model from the set of LLMs using a plurality of varied prompts, LLM model utilization costs, outcome accuracies, and latencies, to generate a regression score.

* * * * *